United States Patent
Cernasov (10) Patent No.: US 8,140,219 B2
(45) Date of Patent: Mar. 20, 2012

(54) AUTOMATIC GLARE REDUCTION SYSTEM FOR VEHICLES

(76) Inventor: Nathalie Grace Cernasov, Ringwood, NJ (US)

( * ) Notice: Subject to any disclaimer, the term of this patent is extended or adjusted under 35 U.S.C. 154(b) by 431 days.

(21) Appl. No.: 12/371,220

(22) Filed: Feb. 13, 2009

(65) Prior Publication Data

US 2009/0204291 A1    Aug. 13, 2009

Related U.S. Application Data

(60) Provisional application No. 61/028,324, filed on Feb. 13, 2008.

(51) Int. Cl.
*G06F 7/00* (2006.01)
*G02B 1/11* (2006.01)

(52) U.S. Cl. ............ 701/36; 359/601; 359/614; 315/77; 362/509

(58) Field of Classification Search ............... 250/203.4; 359/601, 614; 315/77; 362/509; 701/36
See application file for complete search history.

(56) References Cited

U.S. PATENT DOCUMENTS

| | | | | |
|---|---|---|---|---|
| 4,873,516 A | * | 10/1989 | Castleberry | 345/58 |
| 5,298,732 A | * | 3/1994 | Chen | 250/203.4 |
| 5,305,012 A | * | 4/1994 | Faris | 345/7 |
| 5,663,621 A | * | 9/1997 | Popat | 318/480 |
| 6,379,013 B1 | * | 4/2002 | Bechtel et al. | 359/604 |
| 7,199,767 B2 | * | 4/2007 | Spero | 345/7 |
| 7,287,884 B2 | * | 10/2007 | Koike | 362/464 |
| 7,859,737 B2 | * | 12/2010 | McCabe et al. | 359/265 |
| 2006/0175859 A1 | * | 8/2006 | Isaac | 296/97.4 |

FOREIGN PATENT DOCUMENTS

WO    WO 03005942 A1 *   1/2003

OTHER PUBLICATIONS

Auffray, Effect of the Sun Glare on Traffic Flow Quality, Sep. 2007, ENTPE, pp. 1-50.*

* cited by examiner

*Primary Examiner* — Thomas Black
*Assistant Examiner* — Sara Lewandroski (57) ABSTRACT

An apparatus and method of controlling the transparency of at least one window in a vehicle includes at least one multi-segment light filtering element, each segment having a controllable light transmissive characteristic. The apparatus includes at least one sensor configured to determine the physical location and orientation of the vehicle, a memory that includes stored road map information including glare characteristics of each roadway, and a control unit electrically connected to the memory and at least one sensor. The apparatus and method is configured to automatically adjust the transmissive characteristic of the at least one light transmitting element based at least upon stored road map information and the location of the vehicle.

17 Claims, 10 Drawing Sheets

AUTOMATIC GLARE REDUCTION SYSTEM FOR VEHICLES

CROSS-REFERENCE TO RELATED APPLICATION

This application claims the benefit of U.S. Provisional Patent Application Ser. No. 61/028,324 filed Feb. 13, 2008, entitled "Automatic Glare Reduction System for Vehicles," herein incorporated by reference in its entirety.

BACKGROUND OF THE INVENTION

Embodiments of the invention relate to glare reduction devices and, more particularly, relate to glare reduction devices in vehicles.

FIELD

In the operation of various vehicles, from cars and trucks to airplanes, boats and space vehicles, conditions occur where bright sources of radiation (light) impede the vision of the operator of the vehicle. Such sources are said to create a condition of "glare" which, besides creating temporary discomfort, is also dangerous; sun glare, for example, is a contributory factor in 1% to 2% of all car accidents (including accidents resulting in fatalities). Most common glare sources include the sun and various artificial lights such as oncoming or rear view mirror visible vehicle headlights.

Common methods of reducing sun glare include the use of sunglasses, which uniformly reduce the overall intensity of the radiation, and manually positioned sun shields (FIG. 1) of various shapes and sizes which require constant repositioning. As for the glare caused by headlights some cars have steering and tilt sensitive headlights which on occasion direct the light away from the field of view of the on-coming drivers. Still, on constantly turning or sloping roads the effectiveness of such measures is limited. In addition, such controlled headlights must be installed on a majority of vehicles before their use can be measurably effective. A related problem, that of glare reaching the vehicle operator through mirrors (rear and side view), has been partially addressed by means of dual view "tilted" mirrors and electrically activated electrochromic coatings that are non-selective global solutions that dim the whole field of view.

In addition, mechanical systems, such as motorized louvers and mechanically repositionable optical filters, can also be used to selectively block light from reaching the eyes of a vehicle operator.

BRIEF DESCRIPTION OF THE DRAWINGS

One or more embodiments are illustrated by way of example, and not by limitation, in the figures of the accompanying drawings wherein elements having the same reference numeral designations represent like elements throughout and wherein.

DETAILED DESCRIPTION

Figure 1:
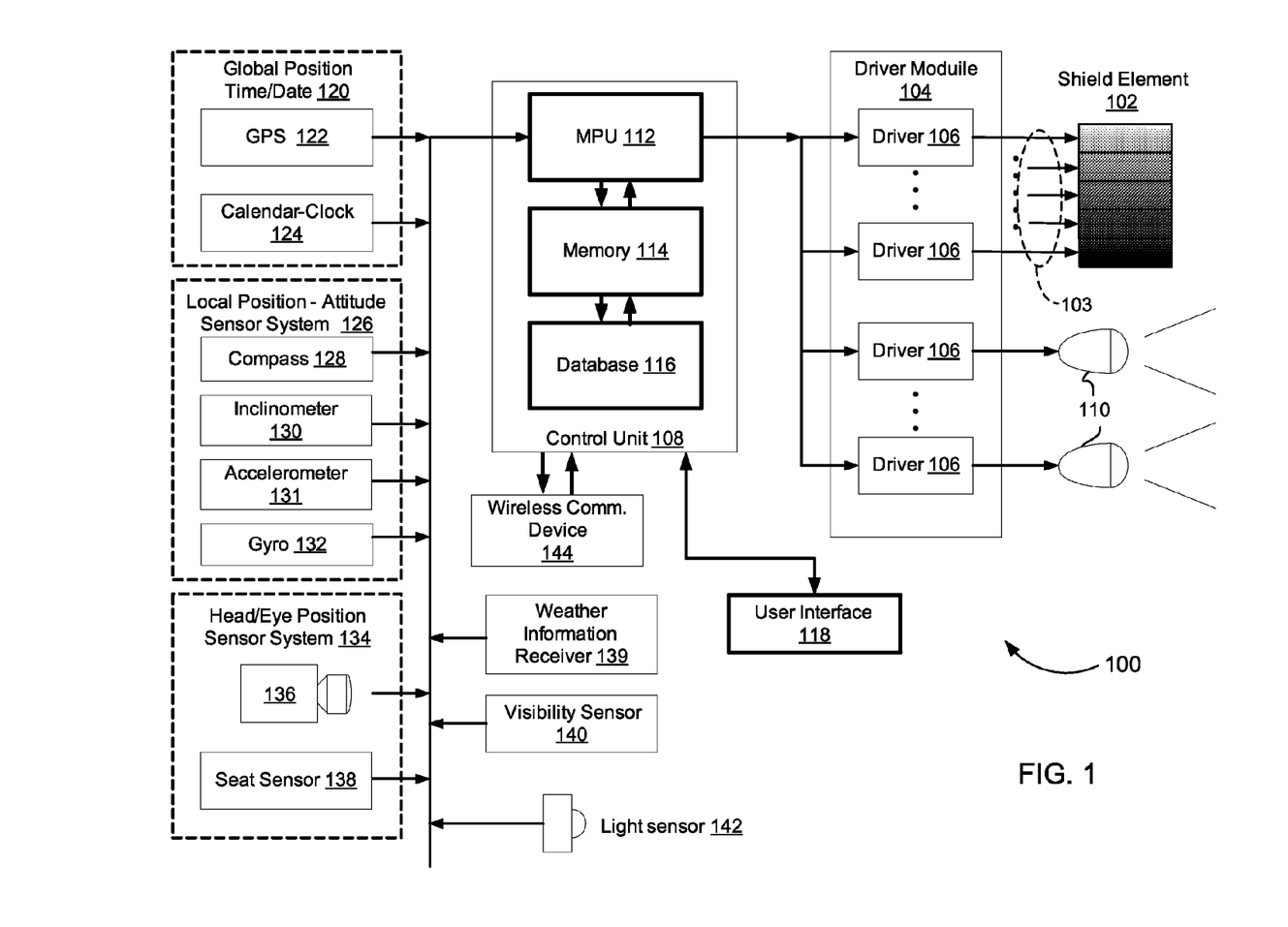
FIG. 1 illustrates glare reduction devices according to one embodiment of the automatic glare reduction system.

FIG. 1 illustrates a vehicle mounted automatic glare reduction system 100 that uses time, vehicle location, and attitude data to select the transparency of each segment of an anti-glare shield system. In one embodiment system 100 comprises multi-segment glare shield element 102 and is based upon "smart glass" technologies including transmissive LC (liquid crystal), electrochromic and electrophoretic (ePaper) light valves wherein the transmissivity of the basic device, e.g. liquid crystal cell, is affected by an applied voltage. Shield element 102 is placed on or integrated with, one or more vehicle windows, each shield element 102 exhibiting electrically controllable light transmissive properties programmable for individual segments of the shield element. Accordingly, if a source of glare, e.g., the sun, is targeting the right top corner of the windshield, the glare reduction system 100 is operable to darken the right top corner of the windshield, while keeping all other sections of the window at full transparency.

Figure 12:
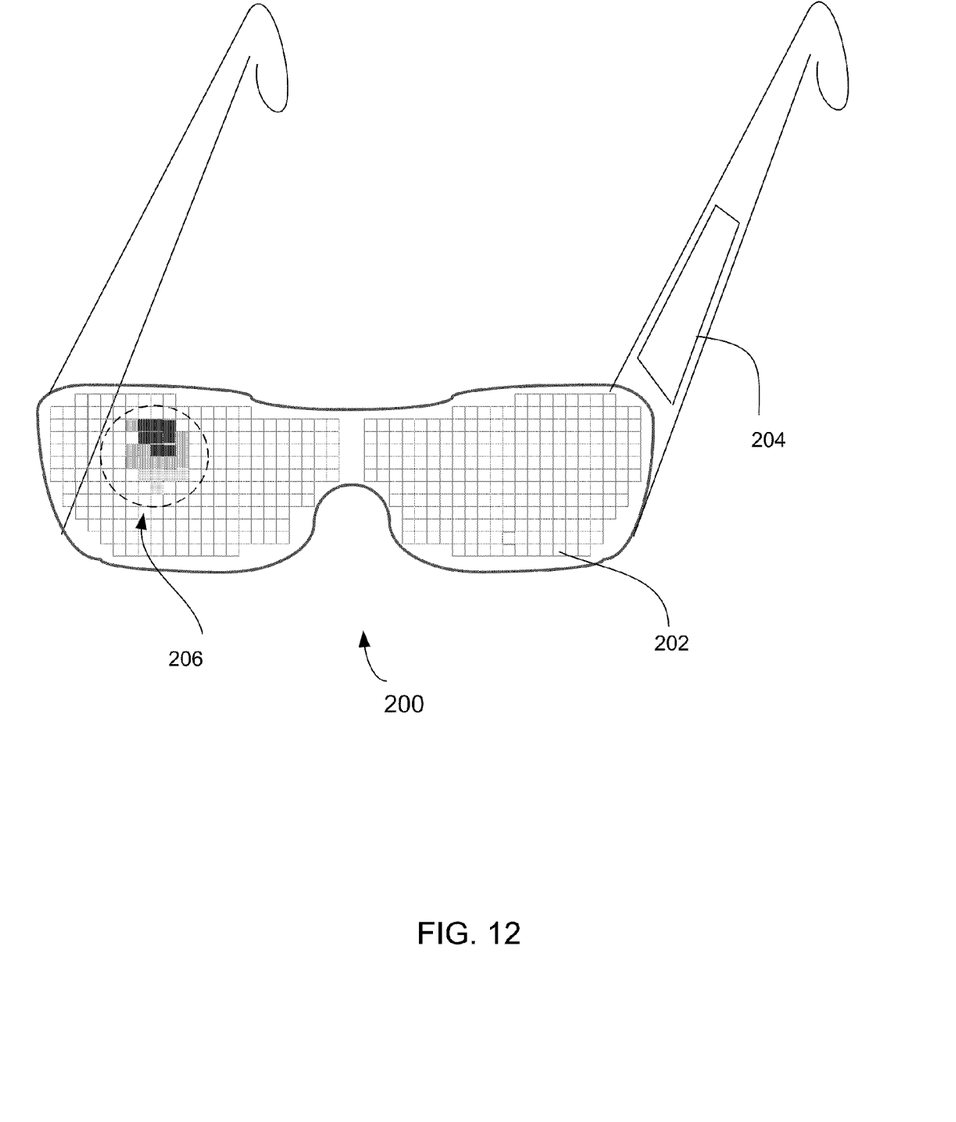
FIG. 12 illustrates another embodiment of the automatic glare reduction system.

The disclosed system 100 is not limited to vehicles and may be incorporated in any structure having a transparent surface that would benefit from glare reduction or automatic transparency adjustment based upon its geographical location, specific exposure, and real time weather conditions. FIG. 12 depicts another embodiment of the glare reduction system that operates to reduce glare in a pair of eyeglasses.

Transparency of each segment of shield element 102 is individually controlled by a driver module 104 that includes a plurality of drivers 106 that based upon inputs from control unit 108, controls a voltage applied to individual segments of shield element 102. In addition to controlling shield element 102, in some embodiments, additional drivers 106 operate to automatically change headlights 110 from high to low beam when approaching other vehicles and adjust the output light distribution profile.

Control unit 108, based upon input from the user and internal and external sources, automatically adjusts the transparency of filter elements 102. Control unit 108 includes in at least some embodiments microprocessor unit (MPU) 112, a memory module 114, and a database 116 that has stored within eye response modeling information, maps, and rules on which the MPU 112 determines how and when to adjust shield elements 102. Memory module 114 includes RAM and program storage medium that may be loaded with a computer executable program at the time of manufacture or may be upgraded at a later time via the wireless communication device 144 to a remote server (not shown).

A user interface 118 permits a user to turn on, turn off, or configure the anti glare reduction system 100 at any time during operation. User interface 118 may include buttons, a display screen, a touch pad, and voice activated and/or haptic technologies. For example, in some embodiments, by use of a touchpad that displays each window surface, a user can adjust one or more shield elements 102 to provide a minimum to a maximum range of transparency, regardless of input from any external or internal sensors.

In some embodiments, inputs to control unit 108 include outputs from multiple sensors that may be hardwired or wirelessly connected to control unit 108. These sensor modules include a global positioning time/date tracking module 120 that further includes a global positioning system (GPS) 122 and clock unit 124 operable to track the location of the vehicle in which the system 100 is mounted.

Local positioning and attitude sensing module 126 includes a compass 128, an inclinometer 130, an accelerometer 131, and a gyro module 132 to further determine the exact orientation of the vehicle.

In some embodiments, head/eye position sensing system 134 includes eye/head position sensors 136, e.g., cameras that track eye movement, and seat position sensors 138.

Still further, system 100 includes, in some embodiments, a weather information receiver 139 that provides local weather conditions that may affect visibility.

In addition, visibility sensor 140 provides an output to control unit 108 and in some embodiments includes a nephelometer, or other device, optical, electrical, or other, that measures the amount of light passing through a test volume of air.

Still further, system 100 includes at least one light sensor 142 that in some embodiments may be mounted in one or more regions of the vehicle, or even rotationally mounted, so as to be able to measure light from multiple directions.

A computer executable program is stored in memory 144 and under control of MPU 112, control unit 108 automatically and selectively adjusts the transmissivity, i.e., transparency, of select portions of shield element 102 based on the stored road glare characteristics in database 116. MPU 112 selects the appropriate information based upon the instantaneous location and local orientation of the vehicle provided by the global positioning time/date tracking module 120 and local positioning and attitude sensing module 126.

Figure 2:
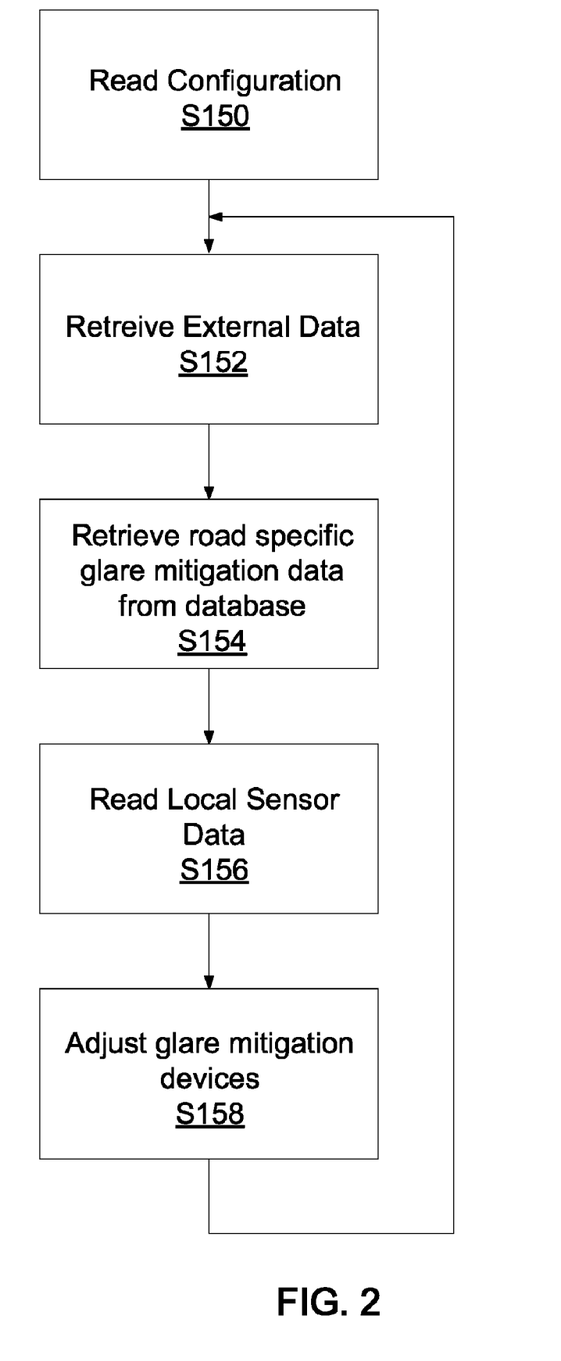
FIG. 2 is a flowchart depicting a method executed by a computer according to an embodiment of the automatic glare reduction system.

The flowchart of FIG. 2 describes one embodiment of a method implemented the stored computer program by which system 100 reduces glare caused by a combination of road conditions, weather, and other vehicles. Starting with S150, the method includes reading of a vehicle configuration file contained in database 116. One component of this file is data related to the mechanical design of the vehicle, including dimensions, geometry and position of at least the windshield, rear and side view mirrors geometry and position, placement and dimensions of the driver seat, etc. Specific vehicle information is unique to each vehicle make and model. This file may be preloaded in the database 116 at the time of purchase, or in some embodiments may be downloaded or updated via wireless communication device 144 from a remote database server.

The vehicle information file further includes the number of installed shield elements 102, their size, their geometry and position, their internal structure (how many individually controllable segments they have, how dark they get, what signals control them, etc.) and the degree of control the driver has over their operation (are they fixed to the car structure or can they be moved by the user). In some embodiments, the glare reduction system 100 is factory installed and the shield element information may be preset. The vehicle configuration file is generally read only at vehicle start-up but may be updated as required based upon operational requirements, or at the initiation of the user.

At S152, system 100 reads, via control unit 108 and the various sensor modules, external data related to time, date, geographical coordinates and altitude. This is done by accessing time and date tracking devices 124 and GPS information supplied by local GPS receiver 122. Based upon the information retrieved at S152, system 100 proceeds to retrieve glare related information from database 116 that contains three dimensional maps of the network of roads in the vicinity of the vehicle (S154). Unique to this glare mitigation system is the fact that for each location point along a road, the stored data include relevant glare sources and glare targets domains.

At any given point on a given road a glare source domain comprises an angle from where light from a remote glare source (located on the same or neighboring road) can reach the eyes of the driver of a vehicle located at that point. At any given point on a given road a glare target domain comprises the angles that may be illuminated by the headlights (or any other glare source) of a vehicle located at that point.

Figure 3:
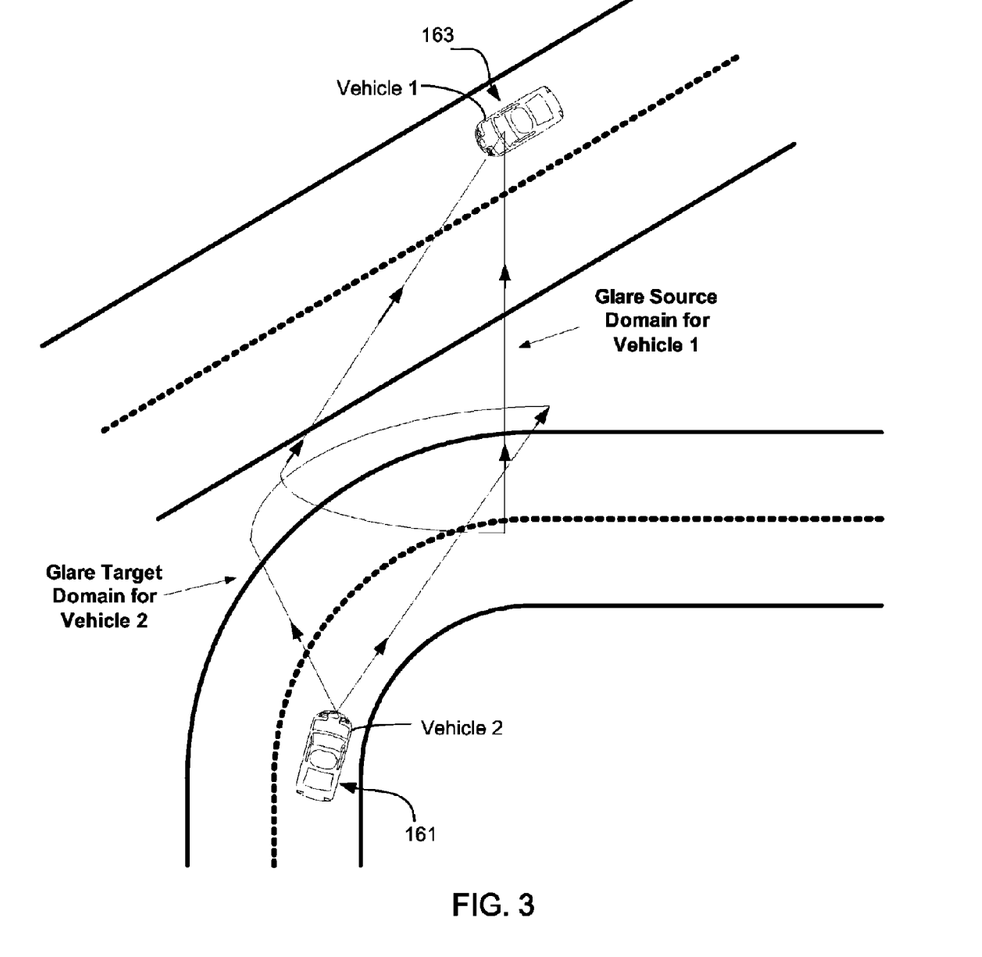
FIG. 3 is an environmental drawing according to an embodiment of the automatic glare reduction system.

FIG. 3 illustrates the relevant glare source domain for a vehicle 1 at position 163 and a glare target domain for a vehicle 2 at position 161. The road geometry is such that the two vehicles are traveling on adjacent roads. Because the light from the headlights of vehicle 1 cannot reach the driver of vehicle 2 (because of the relative position of the two vehicles), the glare target domain of vehicle 1 and glare source domain of vehicle 2 are not shown. The glare target and glare source domains for each location on the roadway is stored in database 116.

Figures 4, 5:
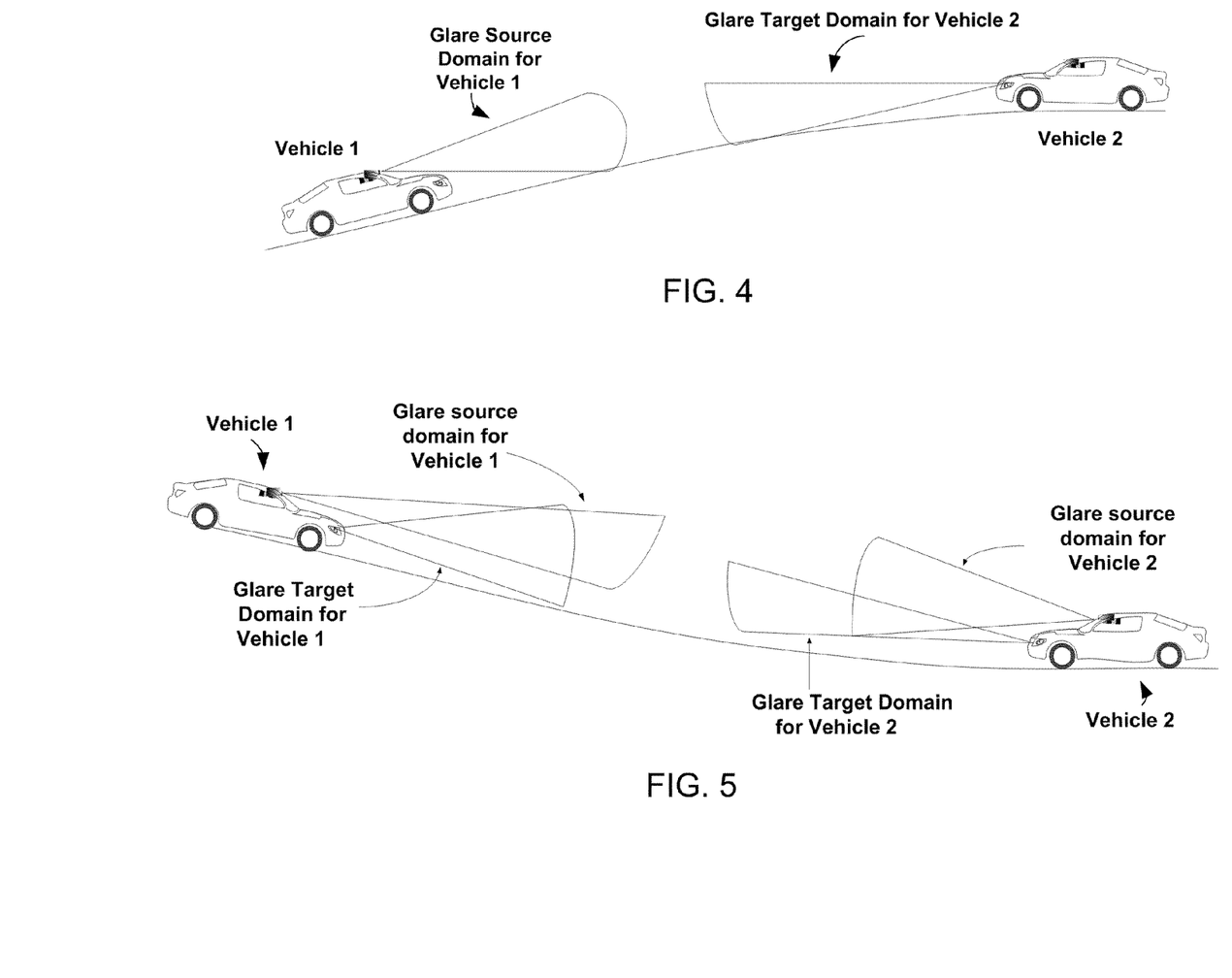
FIGS. 4 and 5 illustrate glare source—target situations.

FIGS. 4 and 5 illustrate other glare source-target situations in which vehicles 1 and 2 are shown traveling in opposite directions on the same road and the road exhibits significant vertical displacements. Because information regarding the characteristics of the road (including local vehicle altitude) is included in each vehicle's road map database 116, potential external glare sources can be mitigated.

As indicated above, in some embodiments, a weather radio receiver 138 is operable to provide enhanced operation, augmenting the stored database information with real time weather information.

At S156, MPU 112 receives input from the set of on-board sensors monitoring the vehicle's operating environment, augmenting the external and/or stored data. The position and orientation of the vehicle may be determined by reading compass and inclinometer data, inertial sensors may provide backup for areas with no GPS coverage, and direct visibility information could be measured by additional visibility specific sensors known in the art.

Depending on user preferences and/or vehicle configuration the transparency of each glare shield element 102, e.g. the windshield unit, may be coarsely set by the driver at vehicle start-up (beginning of a trip) by manual means via user interface 118. MPU 112 automatically adjusts the glare shield element 102 to provide maximum protection against glare from the sun and/or other sources of glare. User interface 118 provides an override capability that can quickly restore the glare shield element 102 to its maximum transmissivity.

Figure 6:
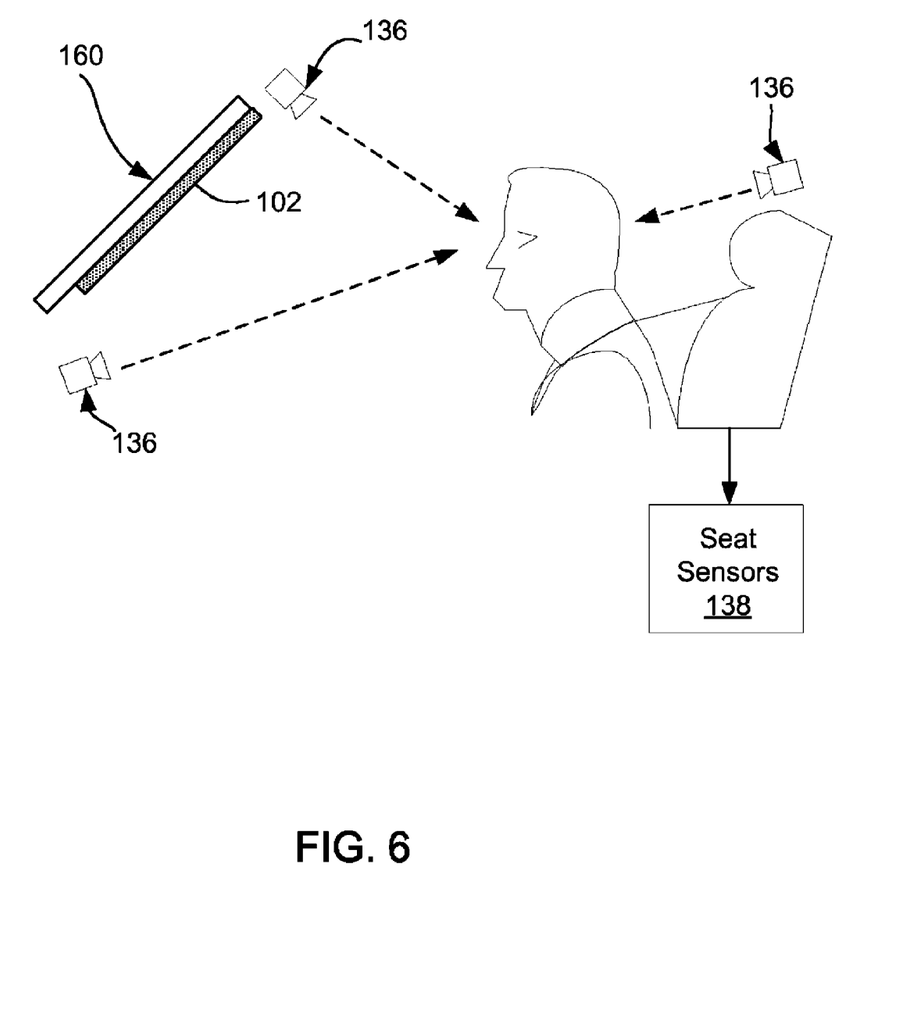
FIG. 6 is a block diagram according to another embodiment of the automatic glare reduction system.

FIG. 6 illustrates further automated control of glare shield element 102 by monitoring the position of the driver's eyes via camera sensors 136, the position and configuration of the driver's seat via seat sensors 138, or by tracking the history of adjustments made by a driver during prior trips. As illustrated in FIG. 6 glare shield element 102 may be disposed on the windshield or other transparent surface 160 of a vehicle. Although in some embodiments shield element 102 may extend only for several inches from the top of the windshield 160, in other embodiments shield element 102 may extend up until the full height of the window. Shield element 102 may be mounted to surface 160 using any of known bonding techniques or laminating techniques.

Furthermore, based on detected current vehicle speed, system 100 is operable to anticipate possible glare sources ahead, gradually adjusting the glare shield element 102 thus providing the driver with more esthetically pleasing operating experience while sparing the driver the shock of sudden sun or headlight blindness.

Once MPU 112 determines the required opacity of each glare shield element 102, system 100 simultaneously provides the driver with maximum protection from glare as well as maximum visibility by driving each segment 102 with appropriate electrical signals (S158).

For most, but not all, "smart glass" devices the transparency or opacity of the device is directly related to the voltage applied across the device. Technology specific electronic drivers convert the "desired opacity" command from MPU 112 into electrical signals which in turn force the glare shield element 102 into the appropriate transparency states.

Figure 7:
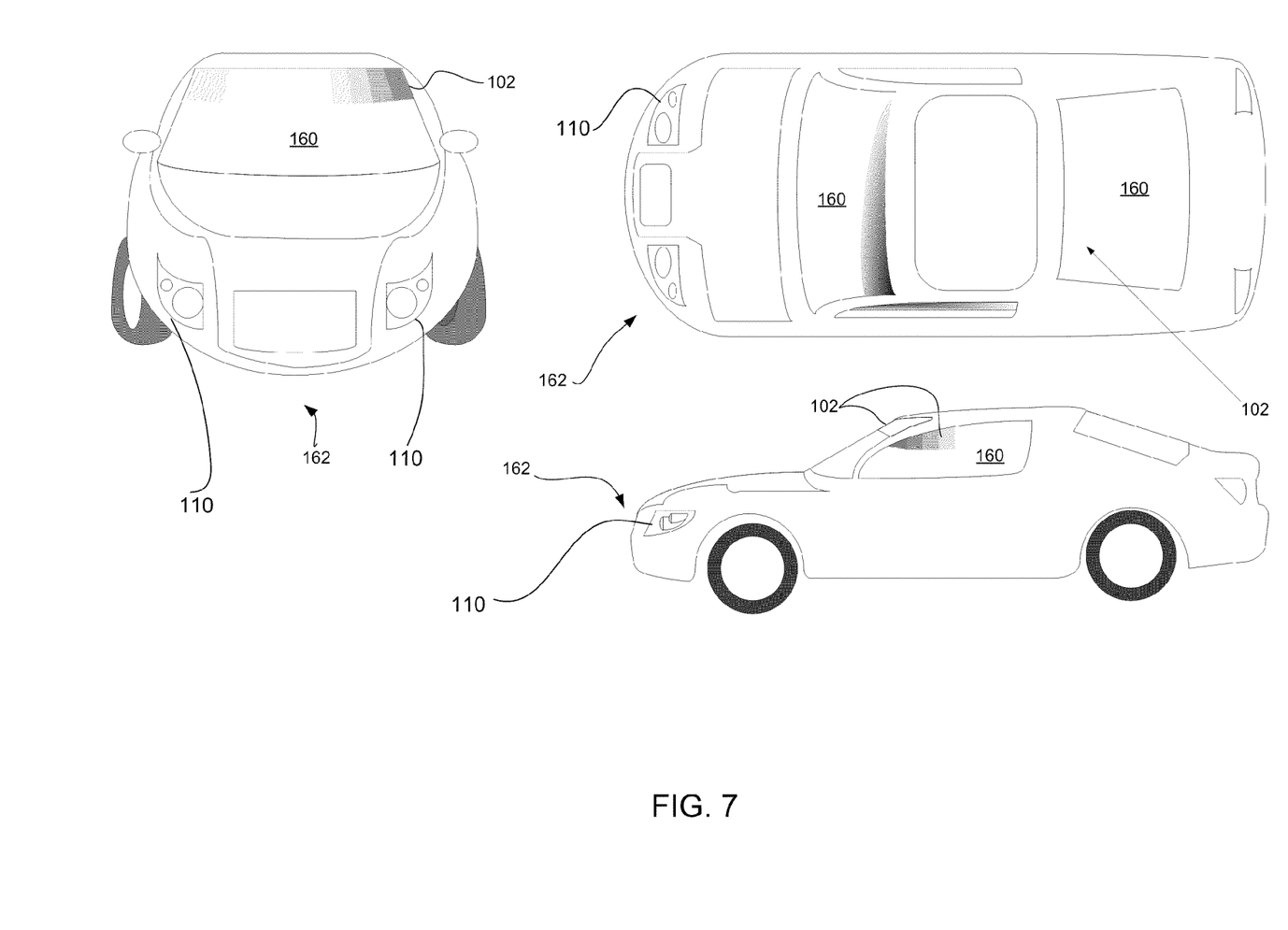
FIG. 7 illustrates placement of glare shields according to an embodiment of automatic glare reduction system.

One placement for the glare shields is depicted in FIG. 7. In this arrangement multi-element glare shields 102 are placed along the top ⅓ to ¼ of the windows around vehicle 162. Other arrangements are possible based at least upon the location of the transparent surface 160 being protected and the surface area to be controlled.

Figure 8:
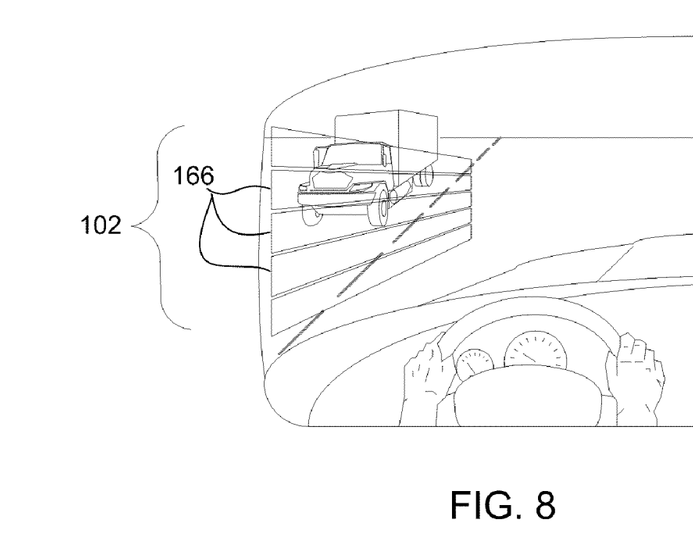
FIG. 8 illustrates another deployment of anti-glare shields according to an embodiment of the automatic glare reduction system.

FIG. 8 shows another effective way of deploying anti-glare "smart glass" shields. This arrangement gives enhanced protection against glare due to oncoming "left-side" traffic while giving the driver good visibility both below and above the "headlight glare" rows. It works by increasing the opacity of that segment of the shield element 102 which covers the horizontal row(s) 166 most likely to correspond to the headlights of an oncoming vehicle.

Figure 9:
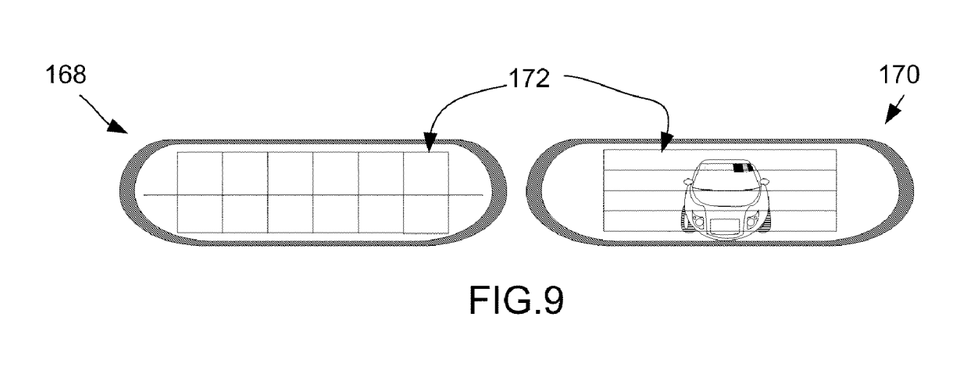
FIG. 9 illustrates a rearview mirror according to an embodiment of the automatic glare reduction system.

In addition, FIG. 9 illustrates wherein system 100 can be used to automatically dim rearview and side mirrors 168, 170 equipped with single segment or multi-segment anti-glare programmable filters 172 and thus eliminate the discomfort caused by reflected sun glare or same lane headlight glare.

Since sun glare may not be a factor on cloudy days an overall light sensor 142 is used in some embodiments to determine if the "clear day" glare predicted by the database, based on time-date and GPS information, is likely to materialize. If no sun glare is likely all shields 102 can be set at maximum transparency.

Alternately, the position information of vehicle 162 combined with the database information can be used to program or shape the output of reconfigurable headlights 110 if such headlights are installed on the vehicles.

Figure 10:
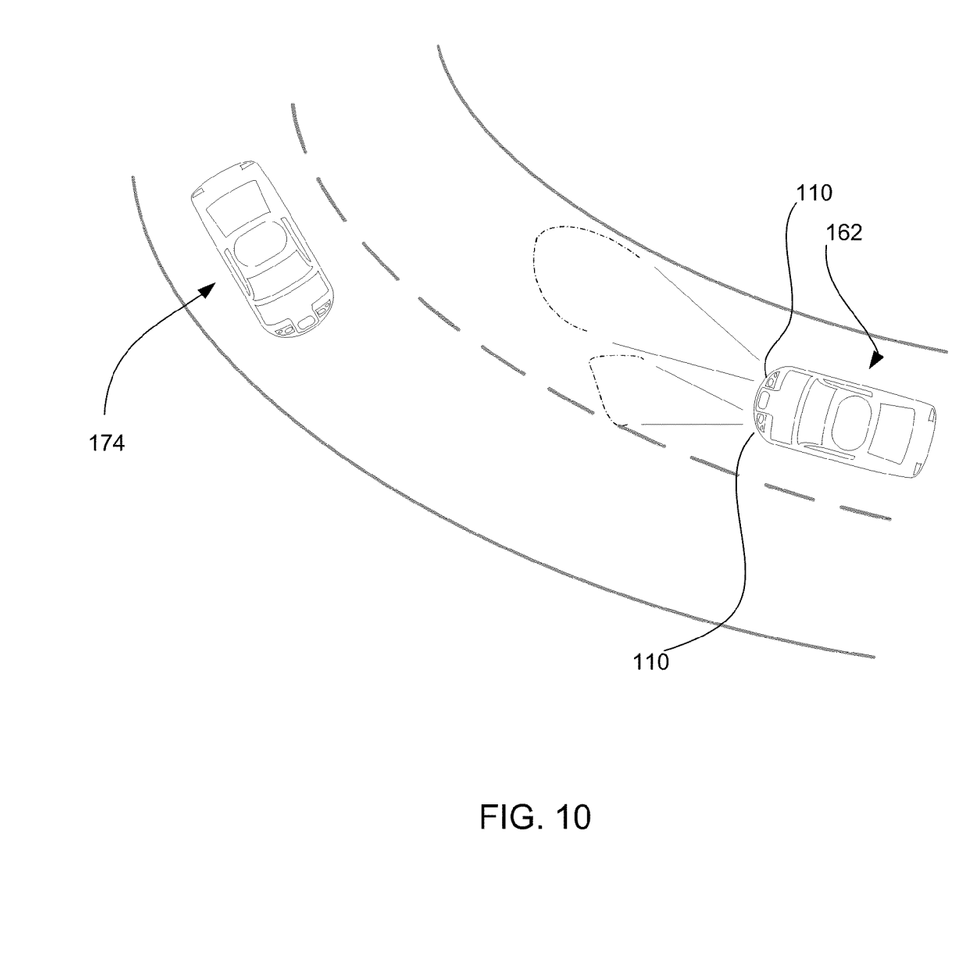
FIG. 10 illustrates shaping the output of configurable headlights according to an embodiment of the automatic glare reduction system.

FIG. 10 exemplifies such an application. In this case the position and attitude of the vehicle is used in conjunction with the road map database information to predict the characteristics of the road ahead. In particular the likely location and attitude of the vehicles 174 in the opposite traffic lane is used to control the lens characteristics of the reconfigurable headlamps 110 as not to produce glare.

Figure 11:
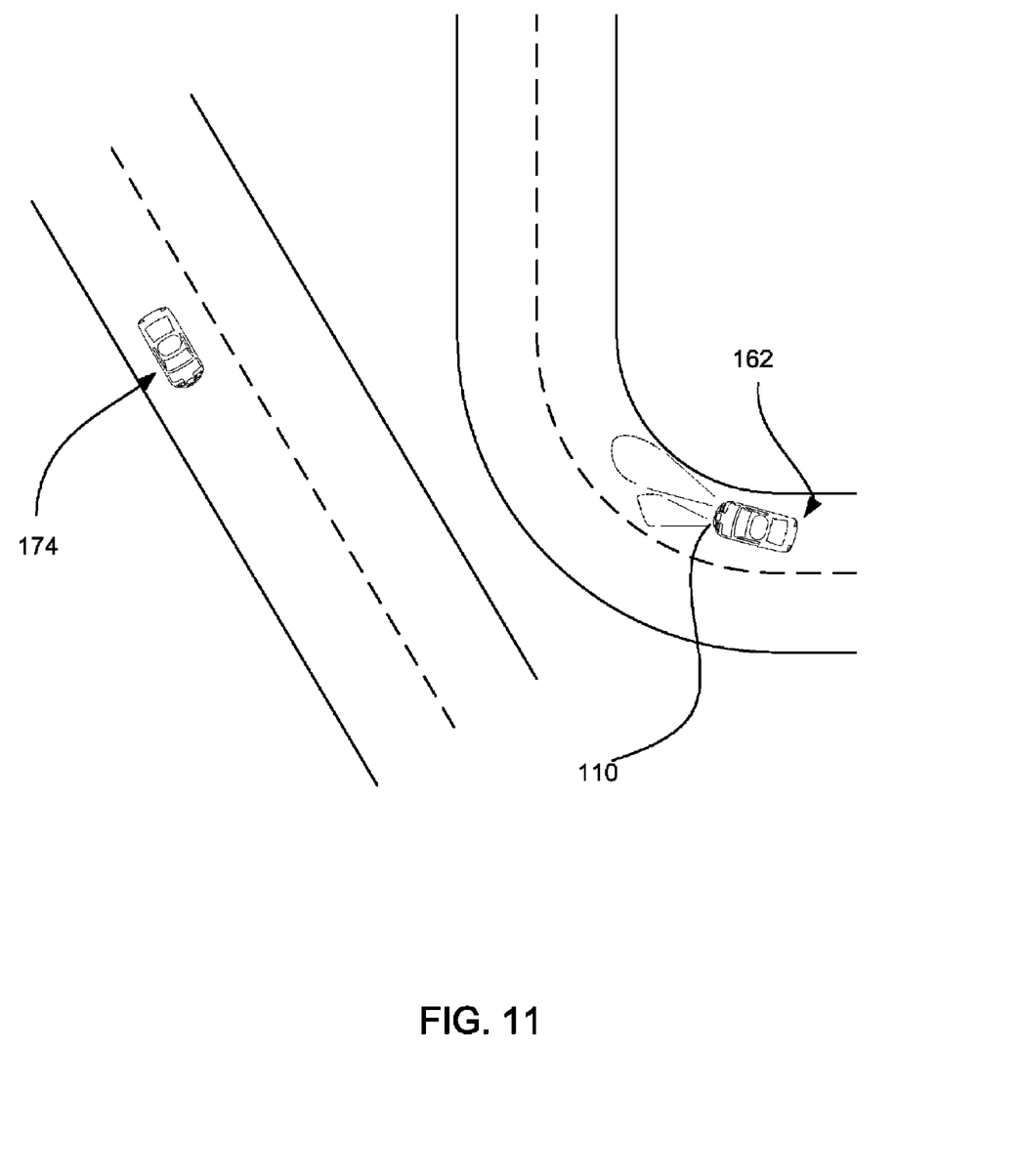
FIG. 11 illustrates another embodiment of configurable headlights as part of the automatic glare reduction system.

FIG. 11 depicts a similar case where a vehicle 162 controls its own glare sources 110 as not to affect vehicles, e.g., vehicle 174, traveling on a different but adjacent road.

FIG. 12 depicts a pair of eyeglasses/sunglasses 200 having a programmable coating of multi-segment light filtering element 202 and control module 204 that allows the programming the transparency of individual lens segments in order to reduce discomfort or increase safety. Control module 204 is integral to the sunglasses 200 and contains a user interface, sensors and control elements similar to those described in FIG. 1, e.g., time-of-day, location and attitude sensors, and voltage drivers for light filtering element 202. The disclosed glare reduction system is not limited to eyeglasses or vehicle. Non-limiting, other embodiments include binoculars, and windows in houses, apartments, office buildings, etc.

The various illustrative logics, logical blocks, and modules described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may include MPU 112, but, in the alternative, the processor may be any conventional processor, controller, microcontroller, or state machine.

Further, the steps and/or actions of the method or algorithm described in connection with the aspects disclosed herein may be embodied directly in hardware, in a software module executed by a processor, e.g., MPU 112, or in a combination of the two. While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A vehicular glare reduction system configured to be installed in a vehicle, comprising:
   at least one multi-segment light filtering element, each segment thereof having a controllable light transmissive characteristic;
   at least one sensor configured to determine the physical location and orientation of the vehicle;
   a memory that includes stored road map information including roadway glare characteristics; and
   a control unit electrically connected to the at least one sensor and the memory, the control unit configured to automatically adjust the transmissive characteristic of at least one segment of the at least one multi-segment light filtering element based upon the stored road map information, and the physical location and orientation of the vehicle.

2. The system according to claim 1, wherein the at least one sensor includes:
   a location determining device having an output that provides the control unit with the physical location of the vehicle;
   a compass module for providing the direction in which the vehicle is facing; and an inclinometer for providing information pertaining to the attitude of the vehicle to the control unit.

3. The system according to claim 1, further comprising a head/eye position sensor, the head/eye position sensor providing an output to the control unit.

4. The system according to claim 1, wherein the at least one light filtering element comprises control leads and an array of at least one of transmissive LC cells, electrochromic, or electrophoretic (ePaper) light valves, the control leads electrically connected to an output of the control unit.

5. The system according to claim 1, wherein a grid of electrodes overlays the light filtering element, the grid of electrodes configured to apply a programmable electrical signal to determined portions of the at least one light filtering element.

6. The system according to claim 1, wherein the at least one light filtering element is a plurality of light filtering elements and wherein the plurality of light filtering elements are mounted on a transparent surface of the vehicle.

7. The system according to claim 1, wherein the memory further includes mechanical design information of the vehicle.

8. The system according to claim 1, further comprising a visibility sensor and a real time weather receiver, each of the visibility sensor and the real time weather receiver configured to provide an input to the control unit, wherein the control unit is further configured to adjust the transmissivity of the at least one light filtering element based upon at least one output of the visibility sensor and the weather receiver.

9. The system according to claim 1, wherein at least one of the at least one light filtering element is mounted on a vehicular headlight and the system is configured to adjust a glare target domain defined by exposed portions of the headlight.

10. The system according to claim 1, wherein the stored roadway glare characteristics include glare source and glare target domains.

11. A method of reducing glare in a vehicle, the method comprising:
    determining a real time location of the vehicle;
    retrieving road and location specific glare mitigation data of the vehicle;
    determining a glare condition based upon the location of the vehicle and the glare mitigation data; and
    adjusting a light transmissivity characteristic of at least one region of a filter element to mitigate the determined glare condition.

12. The method of reducing glare, according to claim 11, wherein determining a glare condition further comprises:
    reading a configuration file including mechanical design information of the vehicle.

13. The method of reducing glare, according to claim 11, wherein reading road specific glare mitigation data includes reading glare source domain and glare target domain information for the determined real time location of the vehicle.

14. The method of reducing glare, according to claim 11, further comprising determining at least one of direction, speed, acceleration, or attitude information of the vehicle.

15. A transparent surface having glare mitigation properties, comprising:
    a light transmissive surface;
    a multi-segment light filtering element disposed on the light transmissive surface, each segment of the light filtering element having an individually controllable light transmissive characteristic; and
    an electrode grid disposed on the light filtering element, the grid configured to deliver an electric signal to the light filtering element that is operative to adjust the light transmissivity of selected portions of the light filtering element;
    wherein the transparent surface is installed as a window in a vehicle, the vehicle comprising a glare reduction system, the glare reduction system including:
    at least one sensor configured to determine the physical location and orientation of the vehicle;
    a memory that includes stored road map information including roadway glare characteristics;
    a control unit electrically connected to the memory and the at least one sensor; and
    a grid driver module having an input connected to the control unit, the grid driver module having an output connected to the electric grid;
    wherein the glare reduction system is configured to automatically adjust transparency of selected portions of the window by automatically adjusting the transmissive characteristic of the light filtering element based upon the stored road map information, and the physical location, and the physical orientation of the vehicle.

16. The transparent surface, according to claim 15, wherein stored roadway glare characteristics includes glare source domain and glare target domain information.

17. The system according to claim 15, wherein the stored roadway glare characteristics include glare source and glare target domains.

* * * * *